(12) United States Patent
Maire

(10) Patent No.: US 12,466,649 B1
(45) Date of Patent: Nov. 11, 2025

(54) RACK LIFTING AND TRANSPORT

(71) Applicant: Amazon Technologies, Inc., Seattle, WA (US)

(72) Inventor: Bertrand Maire, Merville Franceville P (FR)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 480 days.

(21) Appl. No.: 17/937,205

(22) Filed: Sep. 30, 2022

(51) Int. Cl.
B65G 1/10 (2006.01)
B62B 3/00 (2006.01)
B62B 3/06 (2006.01)

(52) U.S. Cl.
CPC ............... *B65G 1/10* (2013.01); *B62B 3/002* (2013.01); *B62B 3/0606* (2013.01)

(58) Field of Classification Search
CPC ..... B62B 3/002; B62B 3/0606; B62B 3/0625; B62B 3/0631; B62B 3/0643; B65G 1/10
See application file for complete search history.

(56) References Cited

U.S. PATENT DOCUMENTS

| | | | | |
|---|---|---|---|---|
| 442,891 A * | 12/1890 | Hite | ...................... | B66F 7/0641 254/10 R |
| 864,902 A * | 9/1907 | Moore | .................. | B62B 3/0625 254/10 C |
| 865,987 A * | 9/1907 | Barlow | ..................... | B62B 1/08 280/46 |
| 940,565 A * | 11/1909 | Temple | ................. | B62B 3/0625 254/10 C |
| 1,129,775 A * | 2/1915 | Anthony | ............... | B62B 3/0631 280/43.12 |
| 2,233,503 A * | 3/1941 | Zeindler | ............... | B62B 3/0606 254/5 C |
| 2,251,606 A * | 8/1941 | Wobbe | .................. | B62B 3/0631 254/10 C |
| 2,840,346 A * | 6/1958 | Du Moulin | ........... | B62B 3/0625 254/8 C |
| 3,059,904 A * | 10/1962 | Kimball | ............... | B62B 3/0625 254/10 C |
| 3,306,579 A * | 2/1967 | Campbell | ............. | B62B 3/0625 254/10 R |
| 5,405,236 A * | 4/1995 | Sundstrom | ............ | B66F 7/0625 414/495 |

(Continued)

*Primary Examiner* — Saul Rodriguez
*Assistant Examiner* — Brendan P Tighe
(74) *Attorney, Agent, or Firm* — Perilla Knox & Hildebrandt LLP; Jonathan A. Paulis

(57) ABSTRACT

An apparatus for moving racks and like devices, referred to herein as a rack moving apparatus, is described that is able to move racks quickly and without disassembly. The rack moving apparatus may include a multitude of wheeled carriages such that the rack moving apparatus can be rolled or otherwise positioned below a rack or other device for relocation. When positioned below a rack or similar storage device, a lever can be manipulated, which causes a multitude of lifting arms of the carriages to raise from a top surface of the apparatus, causing the rack or other storage device to become raised from the floor surface. A frame of the rack moving apparatus is sufficient to receive and retain a frame of a rack such that the rack can be transported without flexing, bending, or toppling of the rack.

20 Claims, 11 Drawing Sheets

(56) References Cited

U.S. PATENT DOCUMENTS

| | | | | |
|---|---|---|---|---|
| 5,449,266 | A | * | 9/1995 | Evans ................... B62B 5/0083 |
| | | | | 254/10 R |
| 6,186,728 | B1 | * | 2/2001 | Michaud ............... B62B 3/0643 |
| | | | | 254/10 R |
| 2017/0240194 | A1 | * | 8/2017 | Kalinowski ............... B62B 3/06 |
| 2017/0297881 | A1 | * | 10/2017 | King ....................... B66F 9/143 |
| 2017/0341667 | A1 | * | 11/2017 | Kalinowski ............... B62B 3/02 |
| 2018/0319212 | A1 | * | 11/2018 | Lindgren .............. B60B 29/001 |

* cited by examiner

RACK LIFTING AND TRANSPORT

BACKGROUND

Fulfillment centers, warehouses, cross-docks, and like facilities include a multitude of racks for storage of various items thereon. The racks are generally constructed of metal, plastic, or other lightweight material that make up a frame having various storage surfaces. Some racks are formed of a minimal amount of plastic, aluminum, or other relatively low-cost material sufficient for storing various items thereon but making their transport difficult. Transporting racks generally involves removing all items from the rack, deconstructing the racks, and reassembling the racks in a new location. As facilities are constantly rearranging racks and like storage devices to optimize workflows, scale up storage, or scale down storage, the movement of racks remains a time- and labor-intensive task.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
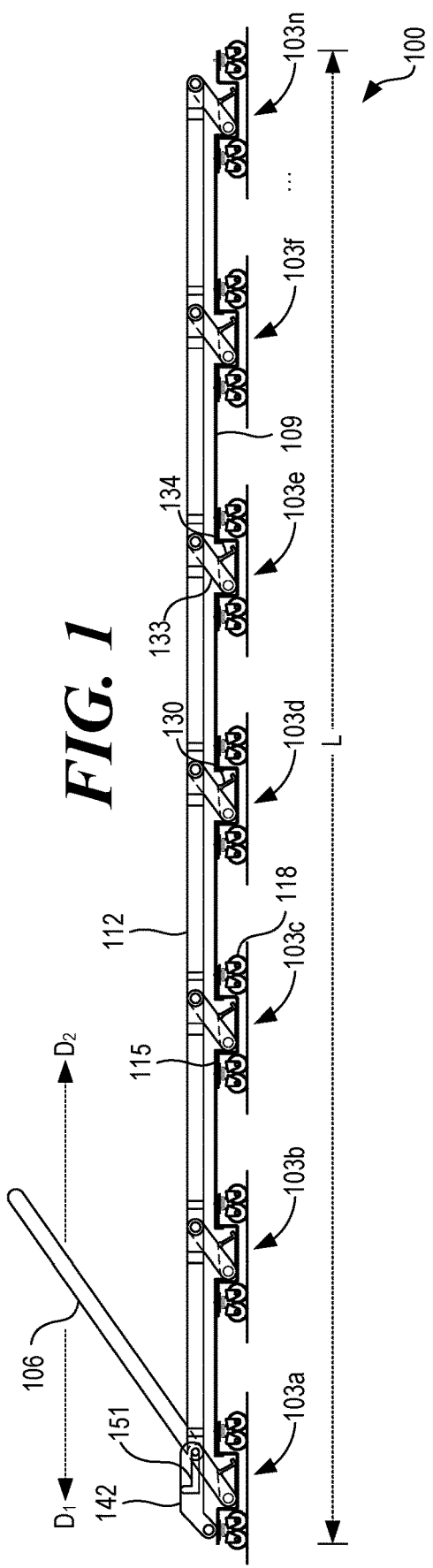
FIG. 1 is a side view of a rack moving apparatus in a lowered position in accordance with various embodiments of the present disclosure.

The present disclosure relates to an apparatus for moving racks and similar storage devices, as well as methods associated therewith. Racks in warehouses, fulfillment centers, and similar facilities can make up parcel sorting aisles having parcels, bins, and other items stored thereon. Transporting racks in warehouses, fulfillment centers, and other similar facilities requires the removal of all items stored on a rack, disassembling all or a portion of the rack, and reconstructing the rack in a new desired location. Facilities are constantly rearranging racks and like storage devices to optimize workflows, scale up storage, or scale down storage.

For instance, in large fulfillment centers in which all racks are to be relocated according to a new rack alignment design, a transport of all racks from an existing location to a new location can take months. Movement of racks and/or sets of racks is traditionally carried out by cumbersome mechanisms (e.g., pallet truck, scooter, and so forth) or complex implementations (e.g., dismantling) may expose personnel to the risk of injury while providing long and costly relocation times.

Accordingly, various embodiments are described for an apparatus for moving racks and like devices, referred to herein as a rack moving apparatus, that can move racks quickly and without disassembly. The rack moving apparatus may have a low-profile frame relative to a floor surface with a multitude of wheeled carriages, such that the rack moving apparatus can be rolled or otherwise positioned below a rack or other device for relocation. When positioned below a rack or similar storage device, a lever can be manipulated, which causes a multitude of lifting arms of the carriages to raise from a top surface of the apparatus, causing the rack or other storage device to become raised from the floor surface. A frame of the rack moving apparatus is sufficient to receive and retain a frame of a rack such that the rack can be transported without flexing, bending, or toppling of the rack.

As such, the rack moving apparatus may be made up of individual in-line carriages equipped with a mechanical lifting system. The rack moving apparatus may be adapted to slide under a set of racks (e.g., laterally under a monobloc set of racks) to be moved or relocated. In some implementations, the rack moving apparatus includes a primary carriage and a multitude of follower carriages. Using a set of mechanical links, a lifting bar may activate a lifting process synchronously in a single manipulation. A position-locking mechanism may be fitted to the primary carriage to maintain the rack moving apparatus in a raised or lifted position, as well as a rack or set of racks situated thereon.

Using the rack moving apparatus and associated methods described herein, performing rack moving and relocations tasks can be reduced from months to days or even hours depending on a number of racks to be relocated. In any event, the movement of racks is enabled without partial or full disassembly, saving hundreds to thousands of hours of personnel time.

Figure 2:
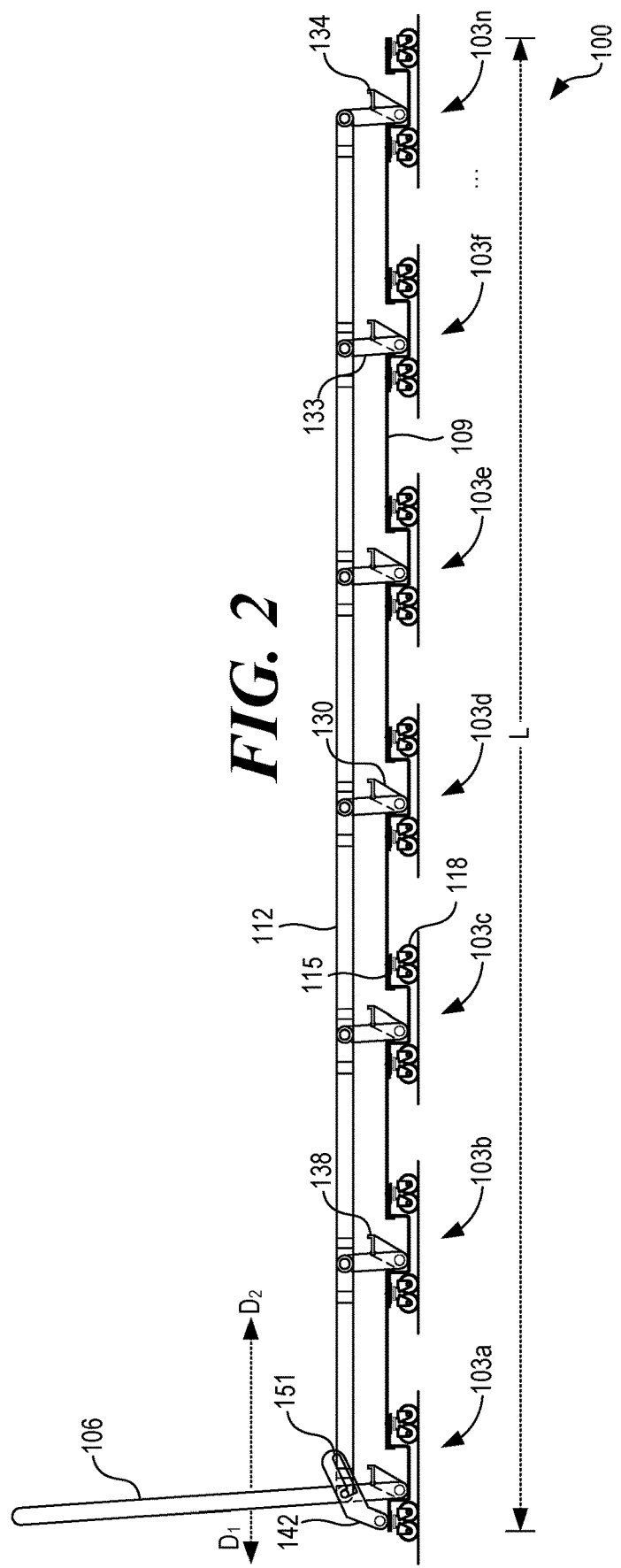
FIG. 2 is a side view of the rack moving apparatus in a raised position in accordance with various embodiments of the present disclosure.

Turning now to the figures, FIGS. 1 and 2 show side views of a non-limiting example of a rack moving apparatus 100 according to various embodiments. More specifically, FIG. 1 shows the rack moving apparatus 100 in a lowered state and FIG. 2 shows the rack moving apparatus 100 in a raised state, as will be discussed. Generally, the rack moving apparatus 100 includes a multitude of carriages 103a . . . 103n (collectively "carriages 103"), a lever 106, a connecting member 109, and a lifting member 112 among other components that will be described.

Beginning with the carriages 103, individual ones of the carriages 103 may include a frame 115 having one or more wheels 118 coupled thereto. For instance, in some embodiments, each carriage 103 may include four wheels 118 where each of the four wheels 118 is coupled to otherwise positioned at a respective corner of the carriage 103. It is understood, however, that in alternative embodiments, other numbers of wheels 118 in other positions may be employed without deviating from the scope of the present disclosure. The wheels 118 may include those having 360 degrees of rotation in some embodiments, such as swivel wheels or caster wheels. However, wheels 118 having other ranges of rotation are permissible in various embodiments.

The frame 115 of a respective carriage 103 may include a first frame surface 121 and a second frame surface 124. The first frame surface 121 and the second frame surface 124 may be raised from a floor by the wheels 118. At least one of the first frame surface 121 and the second frame surface 124 may be coupled to the connecting member 109. In some embodiments, at least one of the first frame surface 121 and the second frame surface 124 is detachably attached to the connecting member 109, such that a variable number of carriages 103 can be attached to the connecting member 109 or removed therefrom, for instance, based at least in part on dimensions of a rack to be raised and transported. For instance, the first frame surface 121 may include apertures that align with corresponding apertures on the connecting member 109 through which a bolt may be positioned and secured with a nut and washer to secure the first frame surface 121 to the connecting member 109. Similarly, the second frame surface 124 may include apertures that align with corresponding apertures on the connecting member 109 through which a bolt may be positioned and secured with a nut and washer to secure the second frame surface 124 to the connecting member 109. Accordingly, the connecting member 109 may be used to link or otherwise coupled carriages 103 together.

Figure 3:
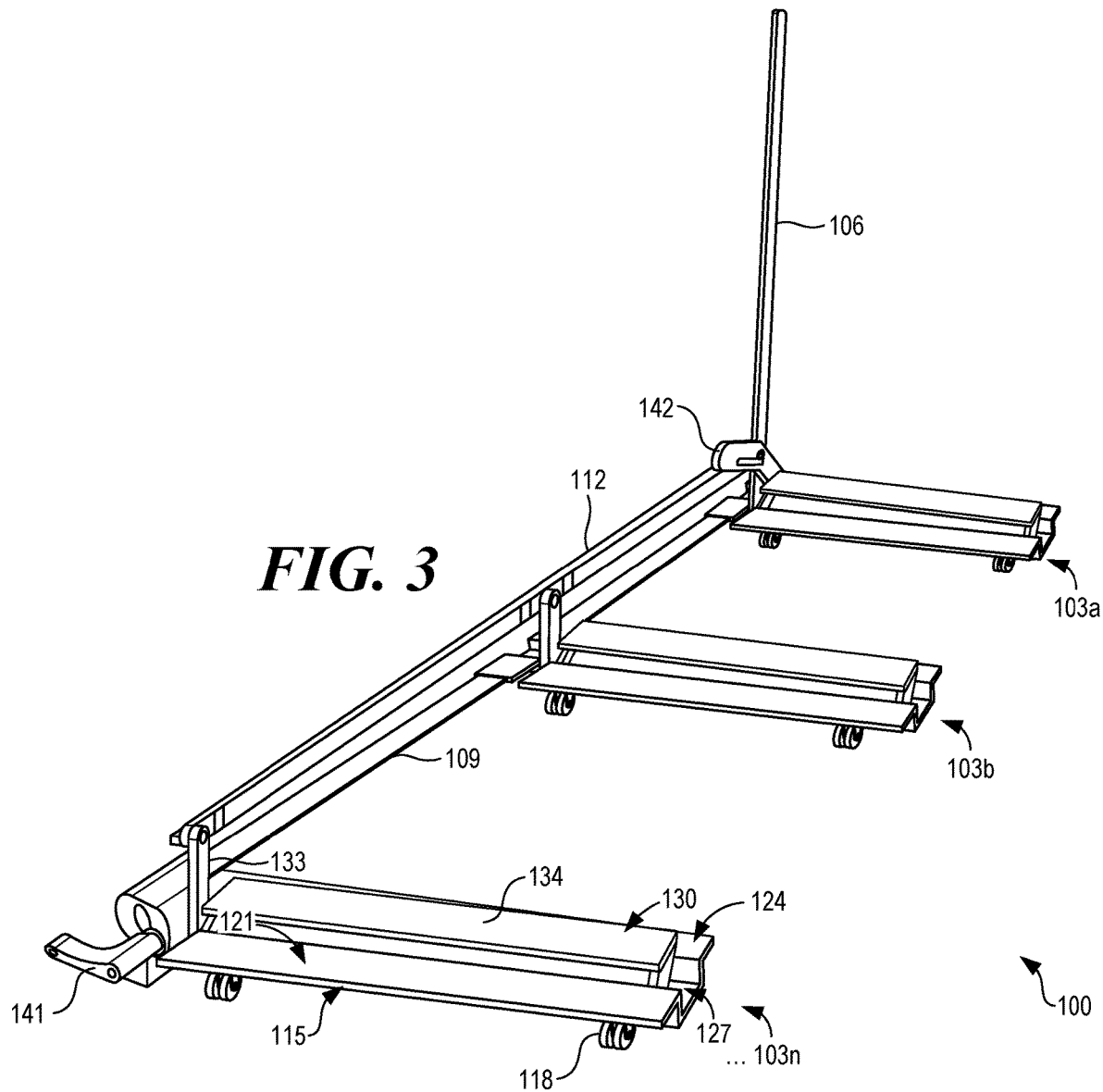
FIG. 3 is a rear perspective view of the rack moving apparatus according to various embodiments of the present disclosure.

Referring to FIGS. 1, 2, and 3 collectively, the first frame surface 121 and/or the second frame surface 124 may include planar surfaces that are positioned perpendicular to the connecting member 109. The first frame surface 121 and the second frame surface 124 may define a recessed area 127 disposed between the first frame surface 121 and the second frame surface 124. As such, a surface in the recessed area 127 may be relatively close to a floor surface to provide a low profile, and may be disposed between a first wheel 118 (or first set of wheels 118) and a second wheel 118 (or a second set of wheels 118). The surface in the recessed area 127 may be closer with respect to the floor surface as compared to the first frame surface 121 and the second frame surface 124.

As noted above, the rack moving apparatus 100 may include a mechanical lifting system. To this end, in various embodiments, individual ones of the carriages 103 may include a lifting arm 130. Generally, the lifting arm 130 may be configured to transition between a lowered position and a raised position, as will be described. The lifting arm 130 may include a U-shaped body in various embodiments, although other shaped bodies may be employed. Further, the lifting arm 130 of a respective carriage 103 may be at least partially disposed within the recessed area 127.

The carriages 103 of the rack moving apparatus 100 may further include one or more pivot arms 133. A bottom end of the pivot arms 133 may be pivotably coupled to frame 115 or, in some embodiments, more specifically to a position in the recessed area 127. To transition between raised and lowered states, the lifting arm 130 of the carriages 103 may be movably coupled to the lifting member 112 as well as the lever 106. For instance, in some embodiments, the lifting arm 130 is coupled to a first end of a pivot arm 133, where a second end of the pivot arm 133 is coupled to the lifting member 112. By virtue of this connection, when the lever 106 is manipulated in a predetermined direction $D_1$ (e.g., moved in a frontward direction), the lever 106 pulls the lifting member 112 in the direction $D_1$. In some embodiments, the lever 106 may be coupled to springs, pneumatics, hydraulics, electronics, or other devices that may facilitate rotating the lever 106.

As the lifting arm 130 is movably coupled to the lifting member 112 via the pivot arm 133, when the lifting member 112 is pulled in the direction $D_1$, the lifting arm 130 will rotate about a bottom end of the pivot arms 133 to position from a lowered state to a raised state, thereby exposing a lifting arm surface 134 that is suited for contacting a bottom portion of a rack. The bottom portion of the rack may include a bottom surface of a rack or a bottom surface of a bottom shelf of the rack, for example. As the lifting arm 130 continues to rotate, the lifting arm 130 will push the rack or other object to be moved upwards slightly relative to a floor surface, facilitating transport of the rack.

The lever 106 is configured to move in a forward direction $D_1$ and a reverse direction $D_2$, and may be movably coupled to the lifting member 112 such that, when the lever 106 is engaged or otherwise manipulated, the lever 106 transitions the lifting arm 130 of the individual ones of the carriages 103 from a lowered state, shown in FIG. 1, to a raised state, shown in FIG. 2. It may be understood that a length of the lever 106 may determine an amount of force required to a lift a rack or other object to be transported. For instance, if the lever 106 is short, a greater amount of force is required by an operator to move the lever 106 in the direction $D_1$, whereas, if the lever 106 is long, a lesser amount of force is required by an operator to move the lever 106 in the direction $D_1$. Accordingly, in some implementations, the lever 106 has a length suitable for average personnel (e.g., a single person) to lift racks or like devices without exerting substantial force. Additionally, the lever 106 may serve as a handle whereby personnel can push, pull, or move the rack moving apparatus 100 laterally in various directions via the lever 106.

The connecting member 109 may include a member extending longitudinally along a length L of the rack moving apparatus 100. In various embodiments, the connecting member 109 may be coupled to the individual ones of the carriages 103 such that the carriages 103 are spaced apart from one another. In some embodiments, the carriages 103 are spaced apart from one another equidistantly. However, in some embodiments, individual ones of the carriages 103, or a portion thereof, may be positioned directly adjacent to one another or without being equidistant to one another. The connecting member 109 may be disposed on a side of the rack moving apparatus 100, such as the same side as the lifting member 112. Similar to embodiments in which the rack moving apparatus 100 includes a single lifting member 112, in some embodiments, the rack moving apparatus 100 may include a single connecting member 109.

In some embodiments, the connecting member 109 may be on substantially a same plane as the first frame surface 121 and/or the second frame surface 124. In the embodiment shown in FIGS. 1 and 2, the connecting member 109 is on a same plane as both the first frame surface 121 and the second frame surface 124. To this end, a height from a floor surface to a top surface of the connecting member 109 may be the same or substantially similar to a height from the floor surface to a top surface of the first frame surface 121 and/or the second frame surface 124.

Similarly, the lifting member 112 may extend longitudinally along the length L of the rack moving apparatus 100.

The lifting member 112 may have a height relative to the floor surface higher than that of the connecting member 109. The lifting member 112 may also be positioned parallel to that of the connecting member 109.

As noted above, the lifting member 112 may be movably coupled to the lifting arm 130 of the individual ones of the carriages 103. The lifting member 112 may include a single lifting member 112 disposed on a side of the rack moving apparatus 100 in some embodiments. However, in alternative embodiments, the lifting member 112 may include two or more lifting members 112. For instance, in embodiments in which the rack moving apparatus 100 includes two lifting members 112, each lifting member 112 thereof may be positioned on opposing sides of the rack moving apparatus 100 facilitating balance of the rack on the rack moving apparatus 100, or at other suitable locations. In another example, in embodiments in which the rack moving apparatus 100 includes three lifting members 112, two lifting members 112 thereof may be positioned on opposing sides of the rack moving apparatus 100 facilitating balance of the rack on the rack moving apparatus 100 whereas a central lifting member 112 may be positioned in a central portion of the rack moving apparatus 100, as may be appreciated.

In some embodiments, the first frame surface 121, the second frame surface 124, and the recessed area 127 are formed integral with one another. To this end, a single piece of metal, plastic, or other desired material may be bent to have a first bend defining an angle of 40 to 120 degrees between the first frame surface 121 and a sidewall of the recessed area 127, and may be bent again to have a second bend defining an angle of 40 to 120 degrees between the second frame surface 124 and an opposing sidewall of the recessed area 127. In some embodiments, the angle the first frame surface 121 and a sidewall of the recessed area 127 defined by the first bend is approximately 90 degrees, and the angle between the second frame surface 124 and an opposing sidewall of the recessed area 127 defined by the second bend is approximately 90 degrees. As such, a frame of the carriages 103 may be U-shaped in some embodiments. To this end, when the rack moving apparatus 100 is positioned underneath a rack to be transported, in some instances, legs of the racks may be positioned in or relative to the recessed area 127.

Figure 4:
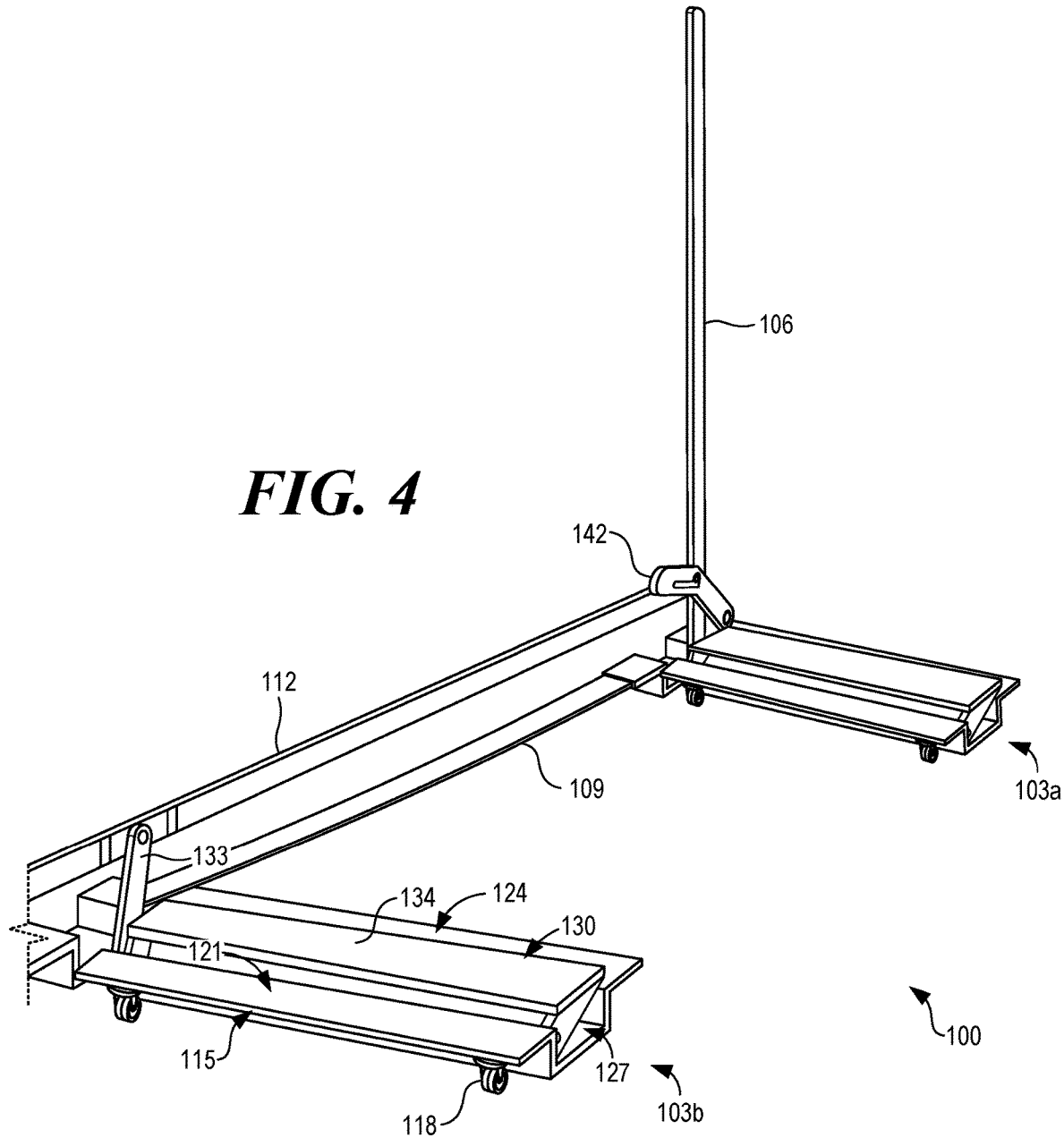
FIG. 4 is a partial side perspective view of the rack moving apparatus in accordance with various embodiments of the present disclosure.

Turning now to FIGS. 3 and 4, a rear perspective view of the rack moving apparatus 100 is shown in FIG. 3 and a partial perspective view of the rack moving apparatus 100 is shown in FIG. 4 according to various embodiments. Referring to FIGS. 3 and 4 collectively, FIGS. 3 and 4 show that a first end (e.g., a bottom end) of the pivot arms 133 may be pivotably coupled to frame 115 or, in some embodiments, more specifically to a position in the recessed area 127. Additionally, a second end (e.g., a top end) may be pivotably coupled to the lifting member 112. The lifting arm 130 of the carriages 103 may be movably coupled to the lifting member 112, as well as the lever 106, via the pivot arms 133. For example, the lifting arm 130 may be coupled to the pivot arm 133, where a second end of the pivot arm 133 is coupled to the lifting member 112. By virtue of this connection, when the lever 106 is manipulated in a predetermined direction $D_1$ (e.g., moved in a frontward direction), the lever 106 pulls the lifting member 112 in the direction $D_1$, which causes the pivot arm 133 and the lifting arm 130 to rotate such that a portion of the lifting arm 130 protrudes above a plane of the first frame surface 121 and the second frame surface 124.

Referring specifically to FIG. 3, FIG. 3 further illustrates that the rack moving apparatus 100 may further include a foot grip 141. The foot grip 141 may be positioned on a rear distal end of the rack moving apparatus 100, for instance, at a rear distal end of the connecting member 109. The foot grip 141 may be handle-shaped or otherwise ergonomically contoured to a foot of an operator. To this end, when moving a rack, a first person may be positioned at a first end of the rack moving apparatus 100 and a second person may be positioned at a second end of the rack moving apparatus 100. The foot grip 141 may facilitate movement of a rack without requiring additional levers 106, handholds, grips, and the like.

Figure 5:
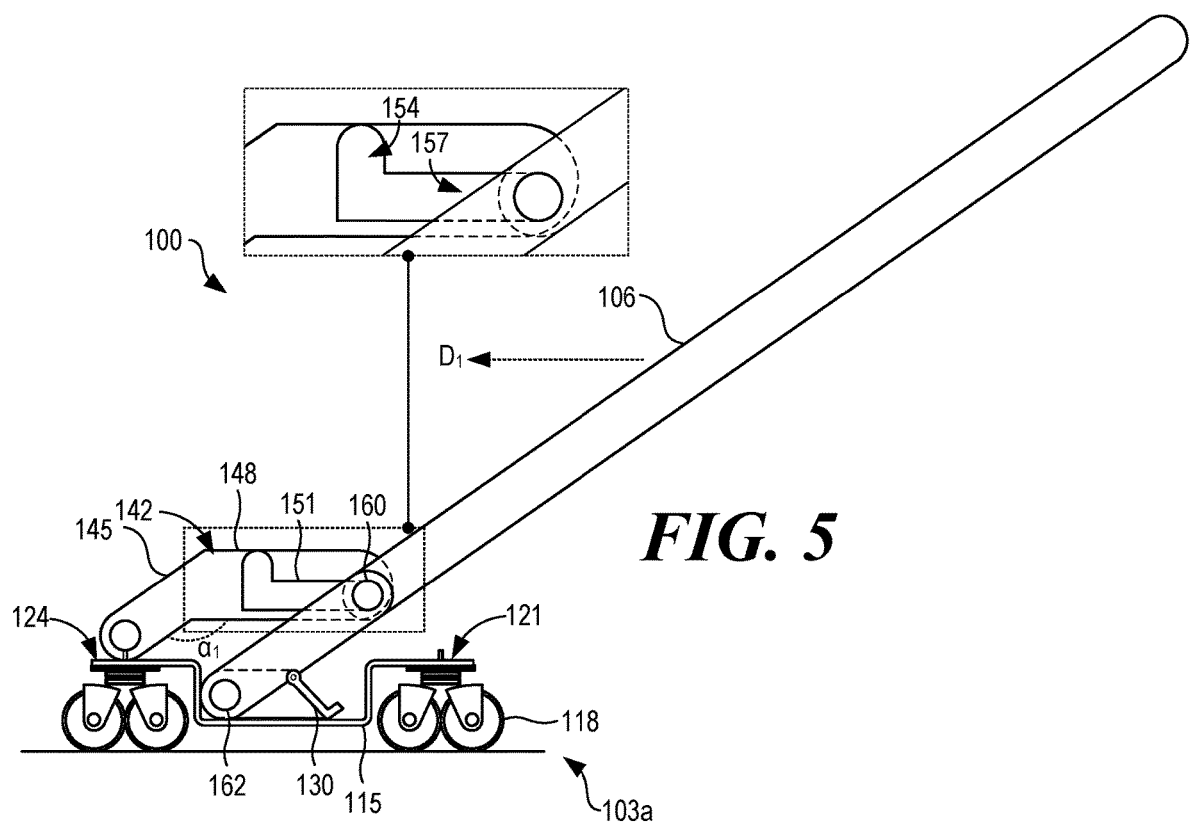
FIG. 5 is a side view of a first carriage and a lever of the rack moving apparatus in accordance with various embodiments of the present disclosure.

Moving along to FIG. 5, a first carriage 103a of the multitude of carriages 103 is shown according to various embodiments. The first carriage 103a may include a carriage 103 having components not included in other ones of the carriages 103b . . . 103n, for example. As such, the first carriage 103a may be referred to as a primary carriage 103a whereas other carriages 103 may be referred to as follower carriages 103 in some implementations. For instance, follower carriages 103 do not include a lever 106, locking mechanisms, and other components as will be described.

Specifically, the lever 106 is shown relative to the first carriage 103a. The lever 106 may be coupled to the rack moving apparatus 100 and/or the first carriage 103a via a connection bracket 142 among other connections mechanisms. The connection bracket 142 may have a first end coupled to the lever 106 and a second end coupled to the frame 115 of the rack moving apparatus 100, the first carriage 103a, or other suitable component. In some embodiments, the connection bracket 142 includes a first bracket member 145, a second bracket member 148, and a detent 151. The first bracket member 145 may be coupled to the second bracket member 148 at a predetermined angle @1. In some embodiments, the predetermined angle $\alpha_1$ is approximately 140 degrees (+10 degrees), although other suitable angles may be employed. The first bracket member 145, the second bracket member 148, and/or the detent 151 may be integral with one another and, as such, the first bracket member 145, the second bracket member 148, and/or the detent 151 may be formed from a same piece of metal, plastic, or the like material.

The detent 151 of the connection bracket 142 may include an L-shaped detent 151 in some embodiments. For instance, the detent 151 may include a first detent member 154 and a second detent member 157 coupled to or integral with one another, where the first detent member 154 is substantially perpendicular to the second detent member 157. It is understood, however, that other angles between the first detent member 154 and the second detent member 157 may be employed. Further, when the rack moving apparatus 100 is in a lowered state or position, as shown in FIG. 1, the first detent member 154 may be positioned vertically with respect to the rack moving apparatus 100, whereas the second detent member 157 may extend longitudinally along the length L of the rack moving apparatus 100 (e.g., parallel with the lifting member 112).

Figure 7:
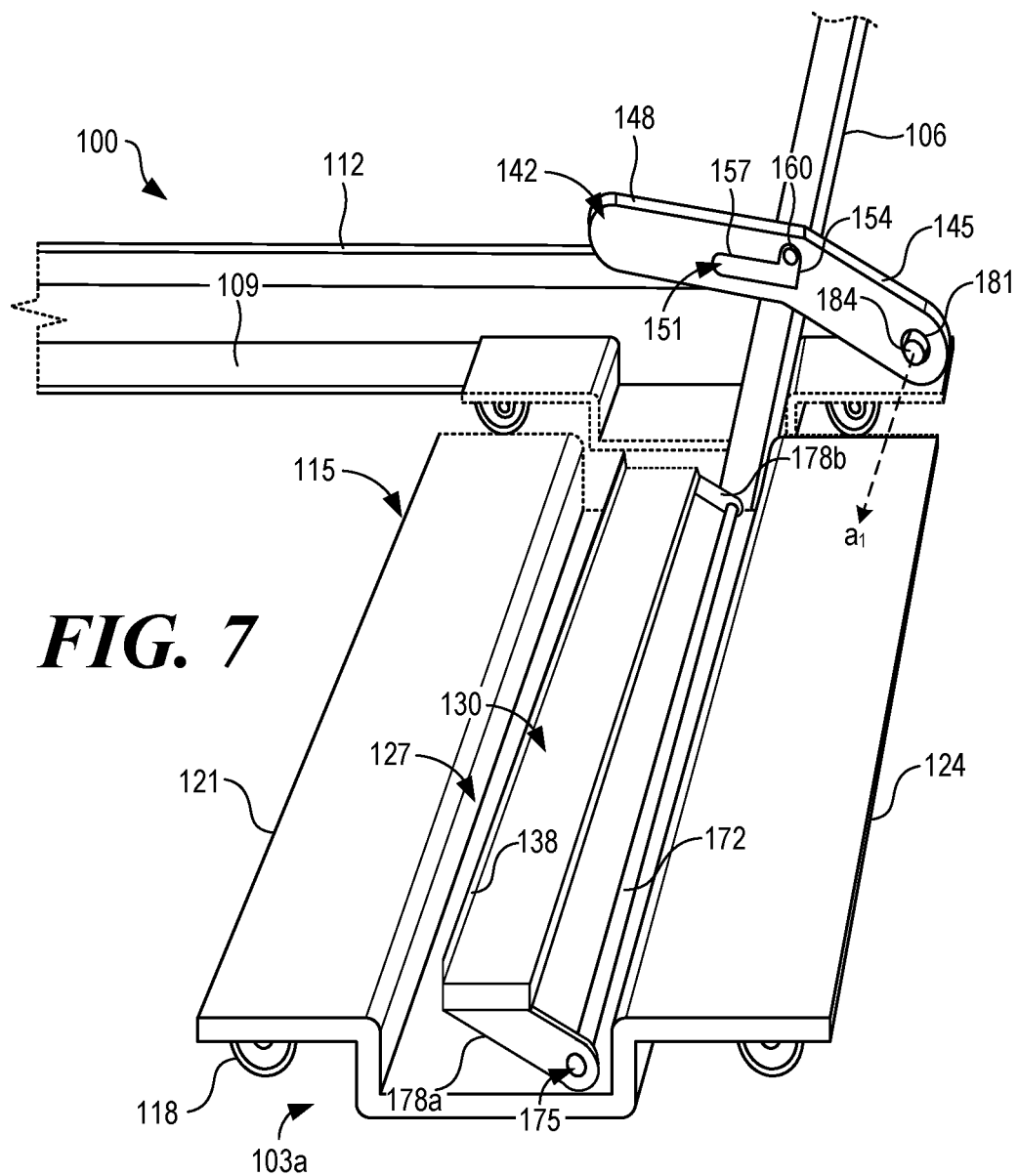
FIG. 7 is a partial side perspective view of the first carriage of the rack moving apparatus in accordance with various embodiments of the present disclosure.

The rack moving apparatus 100 may further include a position-locking device or mechanism that may be fitted to the first carriage 103a to keep the rack moving apparatus 100 in a raised or lifted position, as well as a rack or set of racks situated thereon. It is understood that follower carriages 103b . . . 103n may not include the position-locking mechanism in various implementations. To this end, in some embodiments, the lever 106 may include a projection 160 that is positioned in and slidably engages with the detent 151 of the connection bracket 142. For instance, with respect to FIG. 5, the lever 106 may be pushed in the direction $D_1$ which causes the projection 160 to slide along a path defined by the second detent member 157 until the projection 160 comes into contact with and lodges in the first detent member 154, as shown in FIG. 7.

When the projection 160 is lodged in the first detent member 154, the lever 106 may remain in a locked state until the lever 106 is adequately manipulated to dislodge the projection 160 from the first detent member 154 of the detent 151. For example, the connection bracket 142 may be pulled upward to force the projection 160 down into the second detent member 157. As shown in FIG. 5, the projection 160 may include a circular-shaped projection, but it is understood that the projection 160 may be ovular-shaped, square-shaped, rectangular-shaped, and so forth depending on a configuration of the detent 151.

Figure 6:
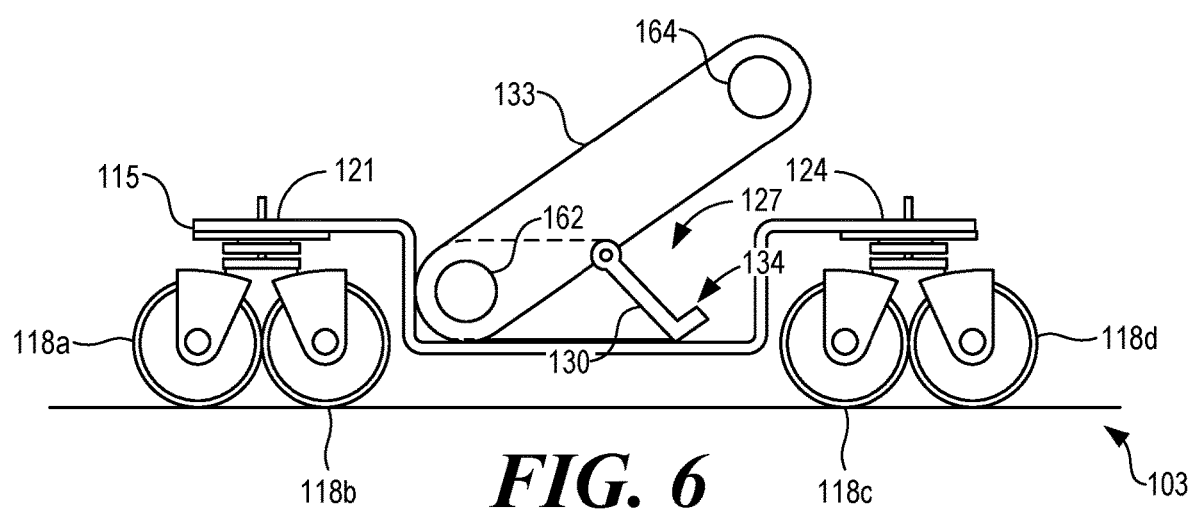
FIG. 6 is a partial side view of a first carriage of the rack moving apparatus in accordance with various embodiments of the present disclosure.

Moving along to FIG. 6, FIG. 6 shows an enlarged side view of a carriage 103, such as a primary carriage 103 shown without a locking mechanism or a follower carriage 103, according to various embodiments. Notably, the carriage 103 is shown independent of the connecting member 109. As shown in FIG. 6, a bottom end of a pivot arm 133 of a respective carriage 103 may be pivotably coupled to the frame 115 or, in some embodiments, more specifically to a position in the recessed area 127. For instance, the pivot arm 133 may include a bottom aperture 162 and a top aperture 164 positioned on opposing distal ends of a body of the pivot arm 133. The bottom aperture 162 and/or the top aperture 164 may be circular-shaped in some embodiments, although other shaped apertures may be employed.

A first projection, such as an elongated rod, may be positioned in the bottom aperture 162 such that the pivot arm 133 is pivotably coupled to the frame 115 and/or the recessed area 127. Similarly, a second projection may be positioned in the top aperture 164 such that the pivot arm 133 is pivotably coupled to the lifting member 112. As such, the lifting arm 130 is coupled to a first end of a pivot arm 133, where a second end of the pivot arm 133 is coupled to the lifting member 112. By virtue of this connection, when the lever 106 is manipulated in a predetermined direction $D_1$ (e.g., moved in a frontward direction), the lever 106 pulls the lifting member 112 in the direction $D_1$.

As the lifting arm 130 is movably coupled to the lifting member 112 via the pivot arm 133, when the lifting member 112 is pulled in the direction $D_1$, the lifting arm 130 will rotate about a bottom end of the pivot arms 133 to position from a lowered state to a raised state, thereby exposing a lifting arm surface 134 that is suited for contacting a bottom portion of a rack. The bottom portion of the rack may include a bottom surface of a rack or a bottom surface of a bottom shelf of the rack, for example. In some embodiments, the lifting arm surface 134, when raised, may be substantially parallel to a ground surface or may include an angle related to the ground surface. Additionally, in some embodiments, the lifting arm surface 134 may include a lip 138 for catching or otherwise contacting a bottom shelf of a rack. As the lifting arm 130 continues to rotate, the lifting arm 130 will push the rack or other object to be moved upwards slightly relative to a floor surface, facilitating transport of the rack.

While various views show only a single pivot arm 133, it is understood that two or more pivot arms 133 may be employed, such as on opposing ends of the lifting arm 130. In this case, a first one of the pivot arms 133 closest to the lifting member 112 may be pivotably coupled to the lifting member 112 as described above, whereas a second one of the pivot arms 133 is only pivotably coupled to the frame 115 and the lifting arm 130. The second one of the pivot arms 133 may provide additional rigidity and support to the lifting arm 130, as may be appreciated.

In various embodiments, the carriage 103 includes the at least one wheel 118 suitably placed for movement of the carriage 103. For instance, in the non-limiting example shown in FIG. 6, the at least one wheel is a multitude of wheels 118, such as a first wheel 118a, a second wheel 118b, a third wheel 118c, and a fourth wheel 118d. The first wheel 118a and the second wheel 118b are disposed below the first frame surface 121, whereas the third wheel 118c and the fourth wheel 118d are disposed below the second frame surface 124. As shown in FIG. 6, the recessed area 127 is positioned between a first set of wheels 118 (e.g., the first wheel 118a and the second wheel 118b) and a second set of wheels 118 (e.g., the third wheel 118c and the fourth wheel 118d).

Figure 10:
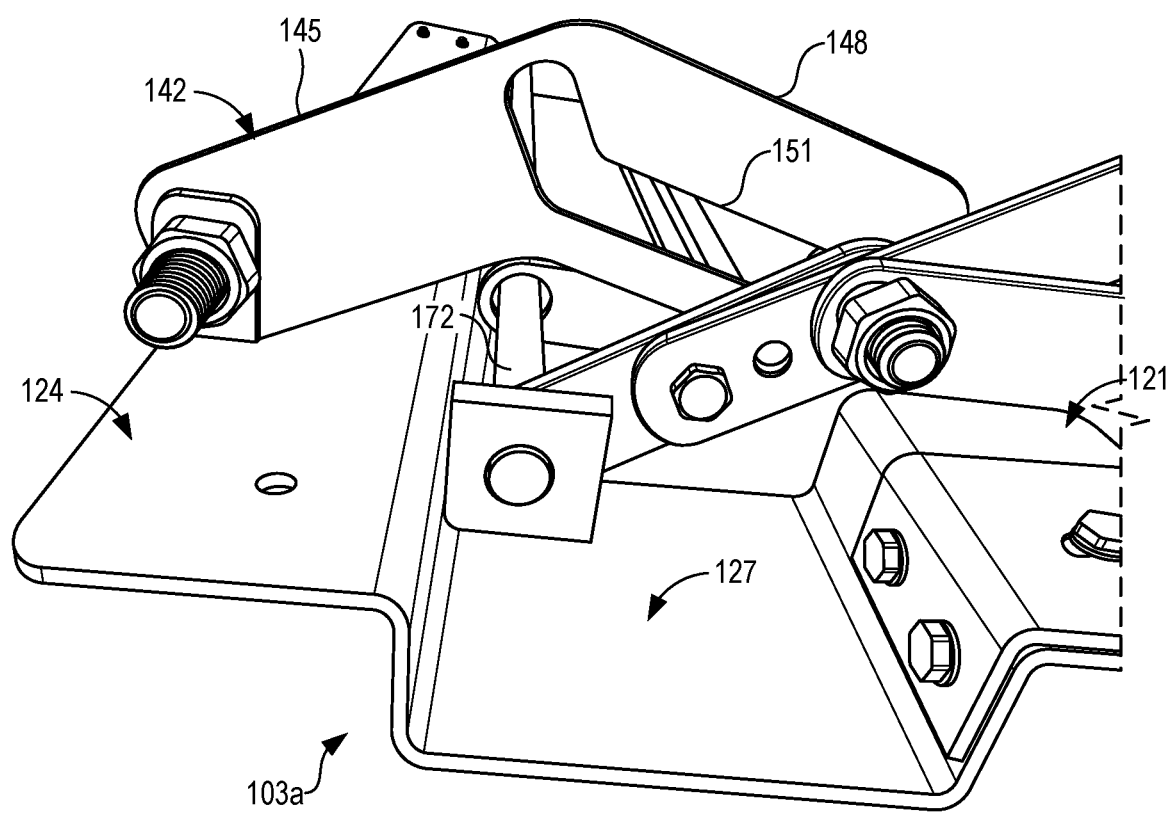
FIG. 10 is a partial perspective side view of a primary carriage of the rack moving apparatus in accordance with various embodiments of the present disclosure.
Figure 11:
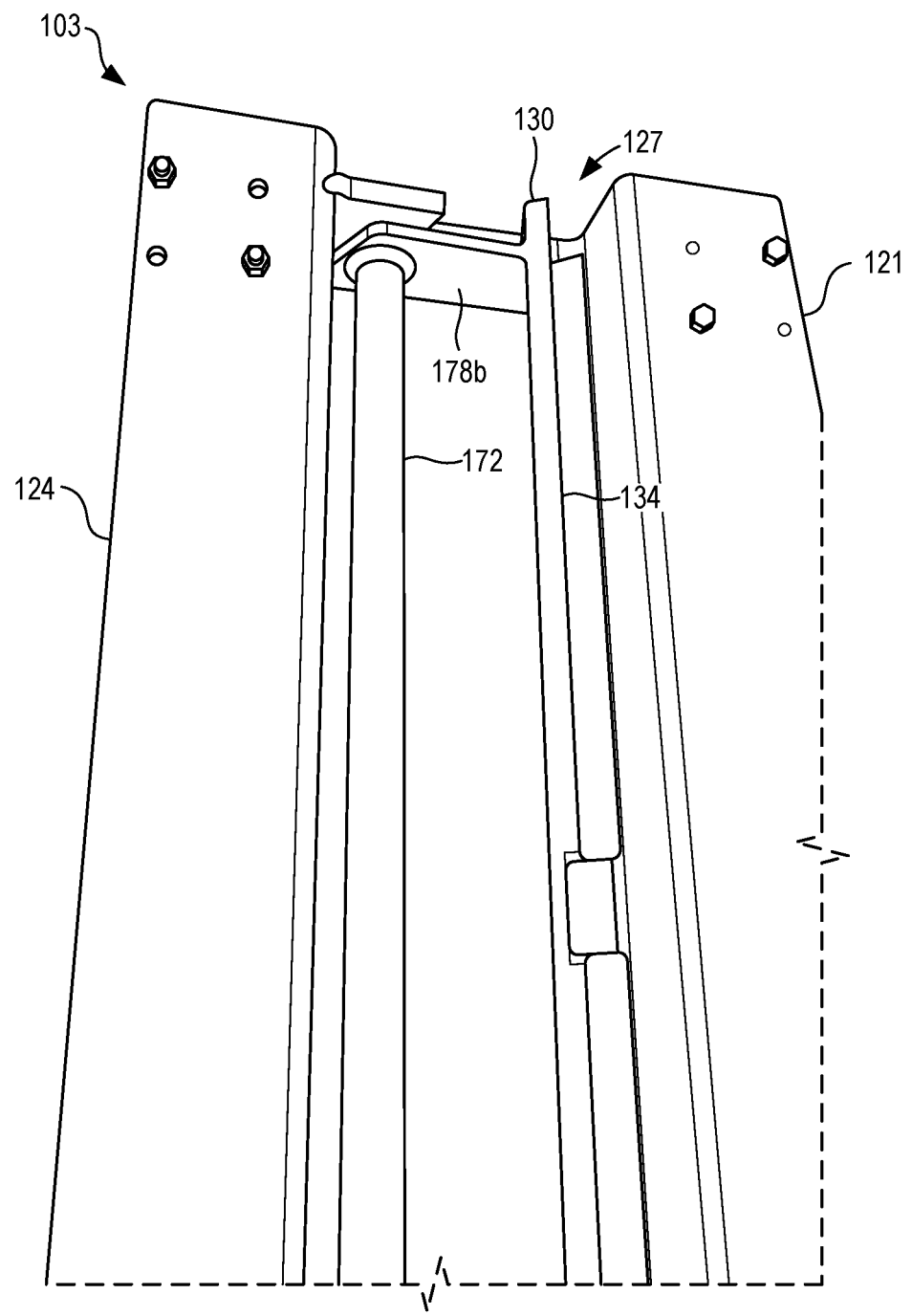
FIG. 11 is a top perspective view of a carriage of the rack moving apparatus in accordance with various embodiments of the present disclosure.

Turning next to FIGS. 7, 10, and 11, a partial side perspective view of the first carriage 103a of the rack moving apparatus 100 is shown in FIG. 7, a partial perspective side view of the first carriage 103a of the rack moving apparatus 100 is shown in FIG. 10, and a top perspective view of a carriage 103 of the rack moving apparatus 100 is shown in FIG. 11 in accordance with various embodiments of the present disclosure. A bottom distal end of the lever 106 may be coupled to a rod 172 that fixedly rotates with the lever 106. For instance, if the lever 106 rotates in a clockwise direction, the rod 172 will likewise rotate in a clockwise direction, whereas, if the lever 106 rotates in a counter-clockwise direction, the rod 172 will similarly rotate in a counter-clockwise direction. The rod 172 may be positioned perpendicularly relative to the lever 106. The lifting arm 130, also positioned perpendicular to the lever 106, may be fixedly connected with the rod 172. For instance, the rod 172 may be fixedly situated in a rod aperture 175 of the lifting arm 130, which is positioned in one of a multitude of lifting arm brackets 178a, 178b (collectively "lifting arm brackets 178") of the lifting arm 130. The lifting arm 130 is also parallel with the rod 172, as seen in FIG. 7 and FIG. 11. As the lever 106 rotates in a clockwise direction, the rod 172 will likewise rotate in the clockwise direction, thereby causing the lifting arm 130 to rotate along with the rod 172.

As seen in the perspective views of FIGS. 7 and 10, the connection bracket 142 may be pivotably coupled to the first carriage 103a, for example. The connection bracket 142 may pivot about an axis $\alpha_1$. As such, the connection bracket 142 may include an aperture 181 that received a projection 184 situated on the first carriage 103a. The aperture 181 may be positioned on a distal end of the first bracket member 145 or at another suitable location. Accordingly, the position-locking mechanism as described may include the projection 160 of the lever 106, the connection bracket 142, the projection 184, among other components as described.

Figure 8:
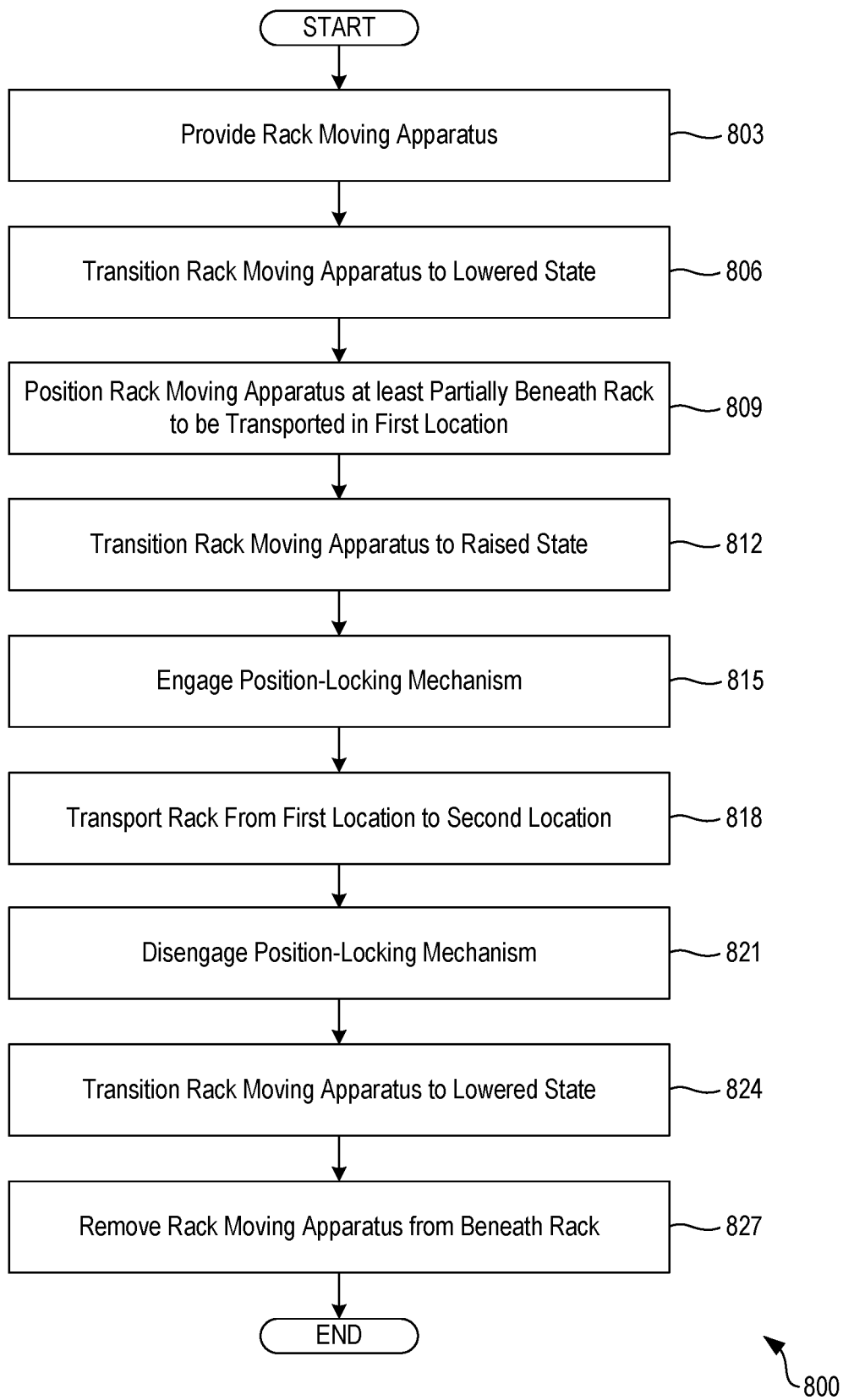
FIG. 8 is a flowchart showing an example operation of the rack moving apparatus in accordance with various embodiments of the present disclosure.

Moving along to FIG. 8, a flowchart 800 is shown illustrating an example method for transporting a rack in accordance with various embodiments. Beginning with box 803, a rack moving apparatus 100 may be provided. The rack moving apparatus 100 may include the rack moving apparatus 100 described above in accordance with various embodiments of the present disclosure. For instance, the rack moving apparatus 100 may include a multitude of carriages 103, a lever 106, a connecting member 109, and a lifting member 112 among other components as described. The carriages 103 may include a primary carriage 103a as well as one or more follower carriages 103b . . . 103n, for example.

Next, in box 806, the rack moving apparatus 100 may be transitioned to a lowered state (or lowered position) if not already in the lowered state. The lowered state may include the lifting arm 130 of the carriages 103 being positioned in the recessed area 127 such that no portion of the lifting arm 130 protrudes above a plane of the first frame surface 121 and/or the second frame surface 124. To transition the rack moving apparatus 100 to the lowered state, the lever 106 may be moved in direction $D_2$ to the state shown in FIG. 2.

In box 809, the rack moving apparatus 100, in the lowered state, may be positioned at least partially beneath a rack or set of racks to be moved or relocated. For example, racks may include vertical rails coupled together using shelving and other hardware, where the racks are not easily separated from one another or from their respective assembly hardware. For instance, vertical rails in the middle connect to horizontal rails on both sides, where disassembly requires substantial removal of hardware. In some embodiments, as the wheels 118 may provide 360 degrees of rotation, the rack moving apparatus 100 may first be positioned parallel to the rack or set of racks to be relocated. Then, the rack moving apparatus 100 may be moved, at least partially, in a lateral direction to slide the rack moving apparatus 100 underneath the rack or set of racks.

Figure 9A:
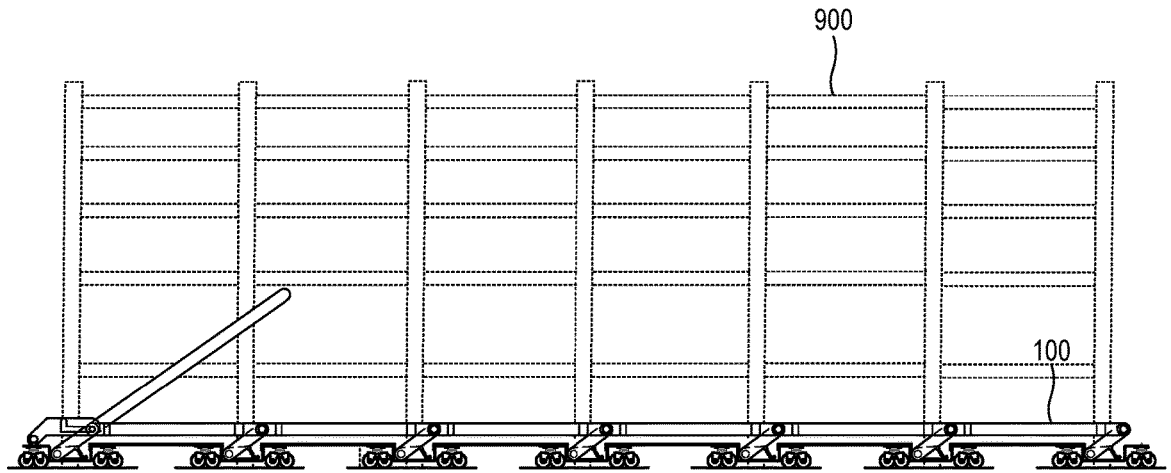
FIG. 9A is a side view of a rack moving apparatus in a lowered position positioned underneath a rack in accordance with various embodiments of the present disclosure.
Figure 9B:
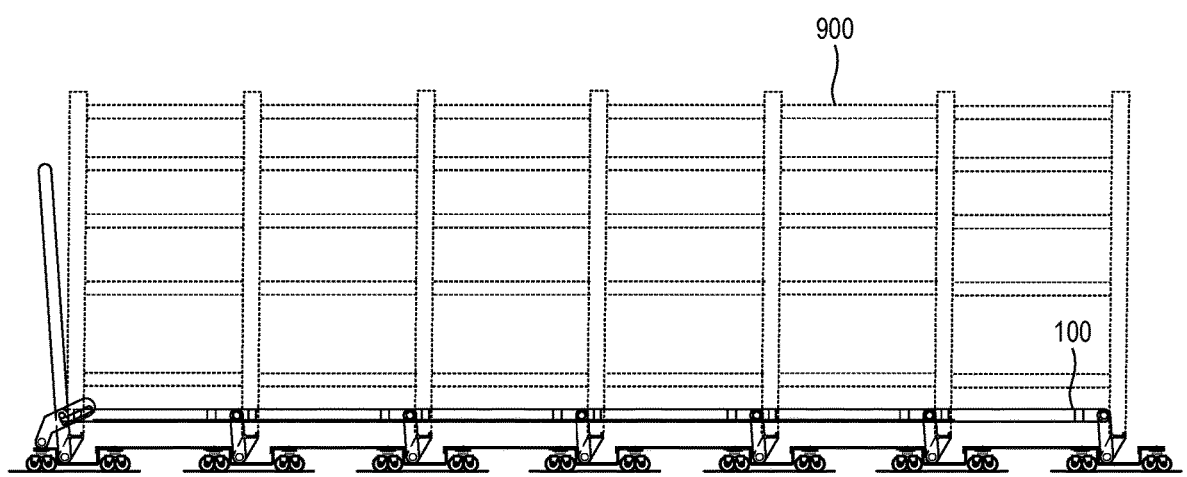
FIG. 9B is a side view of the rack moving apparatus in a raised position having a rack thereon in accordance with various embodiments of the present disclosure.

Next, in box 812, the rack moving apparatus 100 may be transitioned from the lowered state to the raised state, where the raised state may include the lifting arm 130 of the multitude of carriages 103 being raised above a plane of the first frame surface 121 and/or the second frame surface 124. To this end, when positioned below a rack or similar storage device, the lever 106 can be manipulated towards direction $D_1$, which causes a multitude of lifting arms 130 of the carriages 103 to raise from a top surface of the rack moving apparatus 100, causing a rack or other storage device to become raised from the ground surface. The frame 115 of the rack moving apparatus 100 is sufficient to receive and retain a frame of a rack such that the rack can be transported without flexing, bending, or toppling of the rack. FIGS. 9A and 9B show a rack 900 on a floor surface and the rack 900 raised form the floor surface using the rack moving apparatus 100, respectively. Notably, the rack 900 is lifted by the respective lifting arm(s) 130 of individual ones of the carriages 103.

Referring back to FIG. 8, in box 815, a position-locking mechanism of the rack moving apparatus 100 may be engaged which may be fitted to the primary carriage 103a to keep the rack moving apparatus 100 in a raised or lifted position, as well as a rack or set of racks situated thereon. The position-locking mechanism as described may include the projection 160 of the lever 106, the connection bracket 142, the projection 184, among other components as described.

As seen in the perspective view of FIG. 7, the connection bracket 142 may be pivotably coupled to the first carriage 103a, for example. The connection bracket 142 may pivot about an axis $\alpha_1$. As such, the connection bracket 142 may include an aperture 181 that received a projection 184 situated on the first carriage 103a. The aperture 181 may be positioned on a distal end of the first bracket member 145 or at another suitable location. Accordingly, the position-locking mechanism as described may include the projection 160 of the lever 106, the connection bracket 142, the projection 184, among other components as described.

To this end, in some embodiments, the lever 106 may include a projection 160 that is positioned in and slidably engages with the detent 151 of the connection bracket 142. For instance, the lever 106 may be pushed in the direction $D_1$ which causes the projection 160 to slide along a path defined by the second detent member 157 until the projection 160 comes into contact with and lodges in the first detent member 154. When the projection 160 is lodged in the first detent member 154, the lever 106 will remain in a locked state (e.g., while in a raised state) until the lever 106 is adequately manipulated to dislodge the projection 160 from the first detent member 154 of the detent 151. For instance, the connection bracket 142 may be pulled upward to force the projection 160 down into the second detent member 157.

Referring back to FIG. 8, in box 818, the rack may be transported from a first location to a second, different location. In some embodiments, personnel may utilize the lever and/or a body of the rack to move the rack now that a multitude of wheels 118 have been positioned underneath the rack and now that the rack now rests on the rack moving apparatus 100. In some examples, one or more personnel may be stationed along different areas of the rack to further ensure that no toppling or warping of the rack occurs during relocation. It is understood that relocation of the rack may be performed without disassembly and potentially without removing items, totes, and other objects from the rack so long as they are adequately stationary.

Next, in box 821, the position-locking mechanism of the rack moving apparatus 100 may be disengaged. As the position-locking mechanism as described may include the projection 160 of the lever 106, the connection bracket 142, the projection 184, or other components as described, the projections 160 may be disengaged from a locking portion of the detent 151, as may be appreciated.

Thereafter, in box 824, the lever 106 may be transition to a lowered state, thereby lowering the rack as transported. Again, the lowered state may include the lifting arm 130 of the carriages 103 being positioned in the recessed area 127 such that no portion of the lifting arm 130 protrudes above a plane of the first frame surface 121 and/or the second frame surface 124. To transition the rack moving apparatus 100 to the lowered state, the lever 106 may be moved in direction $D_2$ to the state shown in FIG. 2.

In box 827, the rack moving apparatus 100, in the lowered state for example, may be removed from beneath the rack as transported. The rack moving apparatus 100 may then be relocated or repositioned for subsequent rack transfers. Thereafter, the process may proceed to completion.

In various embodiments, a multitude of rack moving apparatuses 100 may be employed in a system for the transport of a rack or other storage devices. For instance, the rack moving apparatus 100 may include a first rack moving apparatus 100a having a first multitude of carriages 103. The first multitude of carriages 103 may include a primary carriage 103a and one or more follower carriages 103b . . . 103n different from the primary carriage, as described above. The system may further include a second rack moving apparatus 100 having a second multitude of carriages 103. The second rack moving apparatus 100 may be spaced apart from the first rack moving apparatus 100. For instance, the first rack moving apparatus 100 may be positioned underneath a first end of a rack and the second rack moving apparatus 100 may be positioned underneath a second end of the rack, facilitating mobile movement of the rack regardless of the length of the rack. It is understood that only the second rack moving apparatus 100 may not include a primary carriage 103a, but may include multiple follower carriages 103b . . . 103n as the primary carriage 103a of the first rack moving apparatus 100 may be sufficient to lift the rack such that the second rack moving apparatus 100 can be positioned underneath. The rack may be similarly transported, as described above. Thereafter, the process may proceed to completion.

According to various embodiments, various materials of the rack moving apparatus 100 may include aluminum, steel, stainless steel, rigid plastic, any combination thereof, and so forth. For instance, the lever 106, the connecting member 109, the lifting arm 130, and/or the frame 115 of the carriages 103 may be formed of aluminum, steel, stainless steel, rigid plastic, any combination thereof, and so forth. It is understood that other materials may be employed such that adequate support can be provided to a rack to be transported without inhibiting transport of the rack.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
  a rack moving apparatus, comprising:
    a plurality of carriages, individual ones of the plurality of carriages comprising a plurality of wheels, wherein the individual ones of the plurality of carriages further comprise a lifting arm configured to transition between a lowered position and a raised position to directly engage a lower surface of a rack positioned above the plurality of carriages;
    a connecting member extending longitudinally along a length of the rack moving apparatus, the connecting member coupled to the individual ones of the plurality of carriages such that the individual ones of the plurality of carriages are spaced apart from one another;
    a single lifting member extending longitudinally along the length of the rack moving apparatus and being coupled to the lifting arm of the individual ones of the plurality of carriages such that actuation of the single lifting member causes simultaneous movement of the lifting arms of the plurality of carriages; and
    a lever coupled to the single lifting member that, when manipulated, transitions the lifting arm of the individual ones of the plurality of carriages from the lowered position to the raised position to simultaneously lift and support the rack from beneath.

2. The system according to claim 1, wherein the individual ones of the plurality of carriages further comprise:
  a frame having a first frame surface and a second frame surface raised from a floor by the plurality of wheels, at least one of the first frame surface and the second frame surface being coupled to the connecting member and positioned perpendicular to the connecting member;
  wherein the first frame surface and the second frame surface define a recessed area disposed between the first frame surface and the second frame surface, the lifting arm is at least partially disposed within the recessed area, and, when in the raised position, the lifting arm projects above a plane of the first frame surface and the second frame surface.

3. The system according to claim 1, wherein:
  the rack moving apparatus is a first rack moving apparatus, and the plurality of carriages is a first plurality of carriages, the first plurality of carriages comprising a primary carriage and at least one follower carriage different from the primary carriage; and
  the system further comprises a second rack moving apparatus spaced apart from the first rack moving apparatus, the second rack moving apparatus comprising a second plurality of carriages.

4. A rack moving apparatus, comprising:
  a plurality of carriages, individual ones of the plurality of carriages comprising at least one wheel, wherein the individual ones of the plurality of carriages further comprise a lifting arm configured to transition between a lowered position and a raised position to directly engage a lower surface of a rack positioned above the plurality of carriages;
  a connecting member extending longitudinally along a length of the rack moving apparatus that is coupled to the individual ones of the plurality of carriages such that at least a portion of the individual ones of the plurality of carriages are spaced apart from one another;
  a lifting member extending longitudinally along the length of the rack moving apparatus and being coupled to the lifting arm of the individual ones of the plurality of carriages such that actuation of the lifting member causes simultaneous movement of the lifting arms of the plurality of carriages; and a lever coupled to the lifting member that, when manipulated, transitions the lifting arm of the individual ones of the plurality of carriages from the lowered position to the raised position to simultaneously lift and support the rack from beneath.

5. The rack moving apparatus according to claim 4, wherein the individual ones of the plurality of carriages further comprise:
a frame having a first frame surface and a second frame surface raised from a floor by the at least one wheel, wherein:
the first frame surface and the second frame surface define a recessed area disposed between the first frame surface and the second frame surface, and
the lifting arm is at least partially disposed within the recessed area.

6. The rack moving apparatus according to claim 5, wherein the individual ones of the plurality of carriages further comprise:
at least one pivot arm, wherein a first end of the at least one pivot arm is pivotably coupled to a frame of a respective one of the plurality of carriages and a second end of the at least one pivot arm is movably coupled to the lifting member.

7. The rack moving apparatus according to claim 5, wherein at least one of the first frame surface and the second frame surface are detachably attached to the connecting member and are positioned perpendicular to the connecting member.

8. The rack moving apparatus according to claim 7, wherein the connecting member is on a same plane as the first frame surface and the second frame surface.

9. The rack moving apparatus according to claim 5, wherein:
the at least one wheel of the individual ones of the plurality of carriages comprises a first wheel, a second wheel, a third wheel, and a fourth wheel;
the first wheel and the second wheel are disposed below the first frame surface;
the third wheel and the fourth wheel are disposed below the second frame surface; and
the recessed area is positioned between the first wheel and the second wheel, and the third wheel and the fourth wheel.

10. The rack moving apparatus according to claim 5, wherein:
the lever is coupled to a first one of the plurality of carriages; and
the first one of the plurality of carriages comprises a position-locking device configured to maintain the rack moving apparatus in the raised position.

11. The rack moving apparatus according to claim 10, wherein:
the lever is coupled to the rack moving apparatus via a connection bracket; and
the connection bracket has a first end coupled to the lever and a second end coupled to a frame of the first one of the plurality of carriages, the connection bracket comprising a detent that retains a projection of the lever therein.

12. The rack moving apparatus according to claim 11, wherein:
the connection bracket further comprises a first bracket member and a second bracket member;
the first bracket member is coupled to the second bracket member at a predetermined angle of approximately 140 degrees; and
the first bracket member, the second bracket member, and the detent are integral with one another.

13. The rack moving apparatus according to claim 12, wherein the detent of the connection bracket is an L-shaped detent having a first detent member and a second detent member coupled to one another, wherein the first detent member is substantially perpendicular to the second detent member.

14. The rack moving apparatus according to claim 4, wherein the lever is configured to:
in response to a manipulation of the lever in a first direction, transition the lifting arm of the plurality of carriages to a raised position; and
in response to a manipulation of the lever in a second direction, transition the lifting arm of the plurality of carriages to a lowered position.

15. The rack moving apparatus according to claim 14, wherein, when the lever is moved in the first direction, the lever is movably coupled to the lifting member to pull the lifting member in the first direction, causing the lifting arm to rotate about an end of a pivot arm and move from the lowered position to the raised position, thereby exposing a lifting arm surface for contacting a rack.

16. A method for lifting and moving a rack, comprising:
providing a rack moving apparatus, the rack moving apparatus comprising a plurality of wheeled carriages each having a lifting arm configured to transition between a lowered position and a raised positioned to directly engage a lower surface of a rack positioned above the plurality of wheeled carriages, a connecting member coupled to individual ones of the plurality of wheeled carriages, a lifting member coupled to the lifting arm of the individual ones of the plurality of wheeled carriages such that actuation of the lifting member causes simultaneous movement of the lifting arms of the plurality of wheeled carriages, and a lever coupled to the lifting member;
manipulating the lever to transition the lifting arm of the individual ones of the plurality of wheeled carriages to the lowered position;
positioning the rack moving apparatus at least partially beneath the rack to be transported; and
manipulating the lever to transition the lifting arm of the individual ones of the plurality of wheeled carriages to the raised position to simultaneously lift and support the rack from beneath, thereby lifting the rack relative to a floor surface.

17. The method according to claim 16, further comprising transporting the rack from a first location to a second location different than the first location.

18. The method according to claim 17, further comprising: prior to transporting the rack from the first location to the second location, engaging a position-locking device to maintain the lifting arm of the individual ones of the plurality of wheeled carriages in the raised position.

19. The method according to claim 16, wherein the individual ones of the plurality of wheeled carriages of the rack moving apparatus as provided further comprise:
a frame having a first frame surface and a second frame surface raised from a floor by a plurality of wheels, wherein:
the first frame surface and the second frame surface define a recessed area disposed between the first frame surface and the second frame surface, and the lifting arm is at least partially disposed within the recessed area.

20. The method according to claim 16, wherein the individual ones of the plurality of wheeled carriages of the rack moving apparatus as provided further comprise:
    at least one pivot arm, wherein a first end of the at least one pivot arm is pivotably coupled to a frame of a respective one of the plurality of wheeled carriages and a second end of the at least one pivot arm is movably coupled to the lifting member.

\* \* \* \* \*